United States Patent
Wang et al.

(10) Patent No.: US 9,117,484 B2
(45) Date of Patent: Aug. 25, 2015

(54) AUDIO MEDIUM FOR A Q PEN

(71) Applicants: Chi-Cheng Wang, Shanghai (CN); Guanyuan Wang, Shanghai (CN)

(72) Inventors: Chi-Cheng Wang, Shanghai (CN); Guanyuan Wang, Shanghai (CN)

(*) Notice: Subject to any disclaimer, the term of this patent is extended or adjusted under 35 U.S.C. 154(b) by 0 days.

(21) Appl. No.: 14/035,033

(22) Filed: Sep. 24, 2013

(65) Prior Publication Data
US 2014/0084053 A1    Mar. 27, 2014

(30) Foreign Application Priority Data
Sep. 24, 2012  (CN) .................. 2012 2 0487631 U

(51) Int. Cl.
*G06F 17/00* (2006.01)
*G11B 20/10* (2006.01)
*G11B 27/10* (2006.01)

(52) U.S. Cl.
CPC ............ *G11B 20/10* (2013.01); *G11B 27/105* (2013.01)

(58) Field of Classification Search
USPC ................. 235/375, 462.01, 462.13; 434/116
See application file for complete search history.

(56) References Cited

U.S. PATENT DOCUMENTS

| | | | | |
|---|---|---|---|---|
| 5,945,656 | A * | 8/1999 | Lemelson et al. | 235/462.01 |
| 6,622,276 | B2 * | 9/2003 | Nagasaki et al. | 714/752 |
| 6,629,635 | B1 * | 10/2003 | Akamine | 235/375 |
| 7,118,039 | B1 * | 10/2006 | Sun et al. | 235/462.01 |

* cited by examiner

*Primary Examiner* — Ahshik Kim
(74) *Attorney, Agent, or Firm* — Wang Law Firm, Inc.; Li K. Wang; Stephen Hsu

(57) ABSTRACT

An audio medium for a Q pen includes a recording area arranged on a side of the medium body and having multiple recording ID codes to associate with the Q pen and a completion area arranged on the side of the medium body and having multiple completion ID codes to associate with the Q pen as well.

9 Claims, 3 Drawing Sheets

AUDIO MEDIUM FOR A Q PEN

CROSS-REFERENCE TO RELATED APPLICATION

This application claims the benefit of CN Application Serial No. 201220487631.7, filed Sep. 24, 2012.

FIELD OF THE INVENTION

The invention relates to an audio medium, and more particularly to an audio medium in associated with a Q pen. The audio medium is capable of playing a previously recorded message corresponding to a mark to which the Q pen is pointed.

BACKGROUND OF THE INVENTION

Conventionally, a Q pen is a kind of pen that is equipped with a photo-sensitive device to detect a mark on an audio medium so as to play a previously recorded message or sound in the Q pen to correspond to the mark. With the contact of the Q pen to the audio medium while the reader is reading the picture or text message, the Q pen is able to playback the audio message in the Q pen.

Currently, the audio medium has only the "play area" and only via the contact of the Q pen to the play area, can he reader obtain the pre-corded audio message, which lacks interaction between the audio medium and the reader and thus pretty dull. The application of Q pen as well as the audio medium is largely restricted.

In order to obviate the problems that the conventional audio medium encountered, it is an objective of the present invention to provide an improved audio medium to associate with the Q pen.

SUMMARY OF THE INVENTION

The primary objective of the present invention is to provide an audio medium associated with the Q pen and provided with a recording function to increase the interaction with the Q pen such that the user can then record anything via the recording function to go with the self-made picture or text on the audio medium.

In order to accomplish the above objective, the audio medium constructed in accordance with one embodiment of the present invention includes a medium body equipped with a playing area having multiple playing ID codes, a recording area and a completion area respectively having multiple recording ID codes and multiple completion ID codes.

Still, the audio medium of one embodiment of the present invention further has a circulating area provided with multiple circulating ID codes.

In one embodiment, the recording area, the completion area and the circulating area are provided on one side of the playing area.

The audio medium has a mark indicating serial number of the audio medium so that the user is able to locate the whereabouts of a particular audio medium by the number.

In one embodiment of the present invention, the audio medium is made of a piece of paper, plastic or metal.

Other objectives, features of the embodiment of the present invention will be much more easily clear and understood after the following detailed description.

DETAILED DESCRIPTION OF THE INVENTION

The following description is merely exemplary in nature and in no way intends to limit the present teachings, applications, or uses. Those of skill in the art will recognize that the following description is merely illustrative of the principles of the invention, which may be applied in various ways to provide many different alternatives embodied in the preferred embodiment of the present invention.

Figure 1:
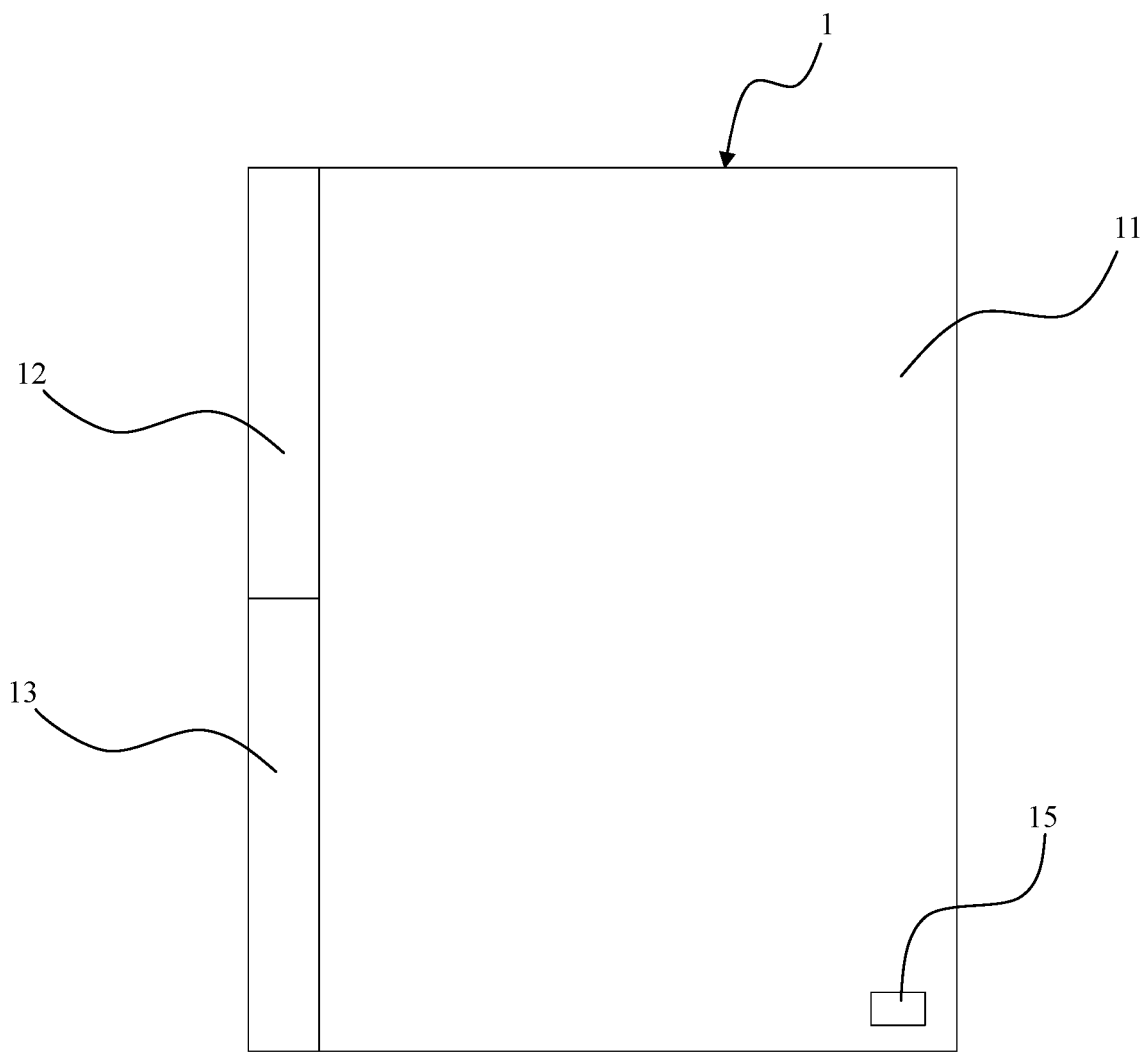
FIG. 1 is a schematic plan view showing the structure of the audio medium of one embodiment of the present invention.
Figure 3:
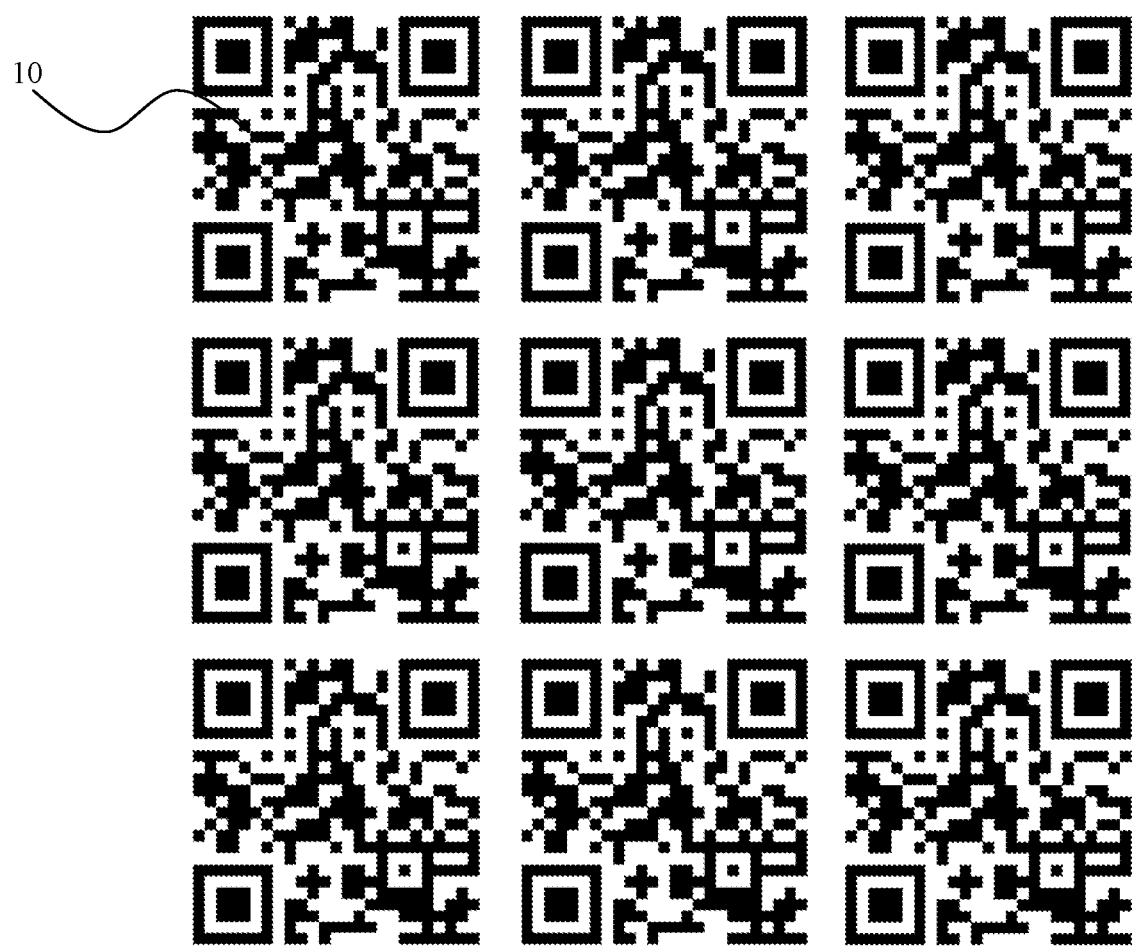
FIG. 3 is a schematic view showing the enlarged ID codes in the play area.

With reference to FIG. 1, the audio medium constructed in accordance with the present invention includes a medium body 1 provided with a playing area 11 which has multiple playing ID codes 10, shown in FIG. 3, presented in a barcode format and arranged in a matrix. The playing ID codes 10 may be glued, printed or pressed on the medium body 1. With the assistance of the playing ID codes 10, after the Q pen (not shown) is used and the photo-sensitive device in the Q pen senses at least one playing ID codes 10, the a least one playing ID codes energizes the previously recorded message in the playing area 11.

In addition to the playing area 11, the medium body 1 further has a recording area 12 and a completion area 13. In one embodiment, the recording area 12 and the completion area 13 are arranged on the left side of the medium body 1 respectively provided with multiple recording ID codes and multiple completion ID codes which are just like the ones shown in FIG. 3 for the playing area 11. The recording ID codes and the completion ID codes are also in the barcode format, which is substantially almost the same as those of the playing ID codes. The only difference between the two categories is that the pattern of the barcode is not the same.

When the Q pen user uses the Q pens to contact the recording area 12, the recording ID codes in the recording area 12 energizes the recording unit in the pen and the Q pen to starts recording. During the recording process, if the user uses the Q pen to contact at least one completion ID codes in the completion area 13, the photo-sensitive device in the Q pen de-energizes the recording and the message during the recording process is then saved automatically.

Furthermore, a serial number mark 15 is labeled on the surface of the medium body 1 via printing at the top or bottom of the medium body 1 as 1, 2, 3 . . . or I, II, III so that when multiple medium bodies 1 are combined and compiled into a pile, a book for example, it is much more easier for the user to keep track to a particular medium body 1. The medium body 1 may be made of a piece of paper, plastic or metal. With the recording area 12 and the completion area 13 arranged on a side of the medium body 1, the user may use the rest of the medium body 1 to make a picture, a drawing or leave a text message on the medium body 1 and then record whatever the user wants to record into the Q pen so that whenever the user contacts the ID codes in, for example, the playing area 11, the previously recorded message will be played through the Q pen. For example, a love one is lost in the family and all the good friends come to the family to pay their respect. Each one of the close friends may leave a message/drawing on the available area of the medium body 1 and follow the previous process to record whatever he/she wants to say and then end the recording by contacting the completion area 13. In the later days, people may playback whatever is recorded in the Q pen to refresh the memory or to memorize someone by.

Figure 2:
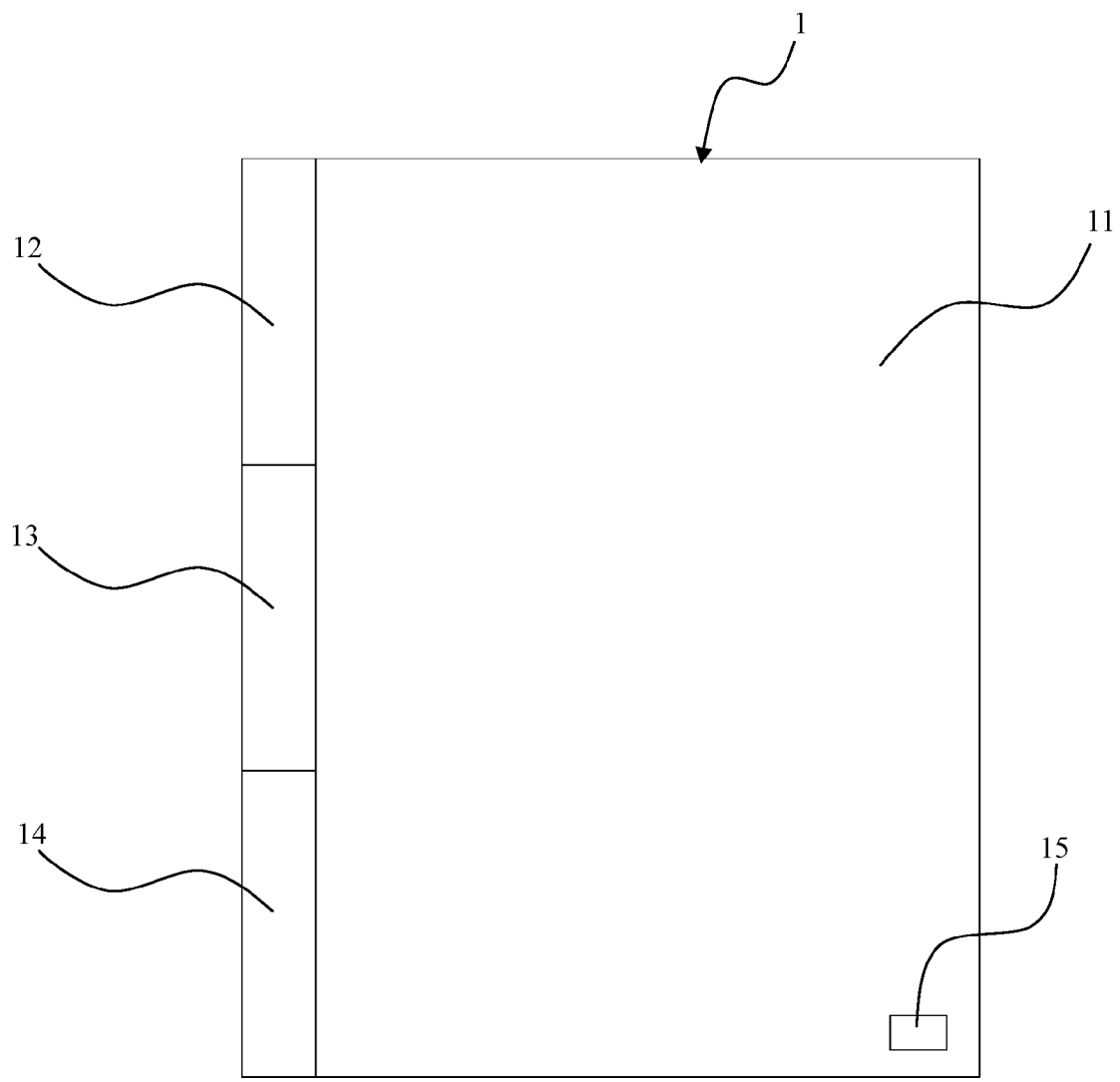
FIG. 2 is a schematic plan view showing the structure of the audio medium of the second embodiment of the present invention.

With reference to FIG. 2, a circulating area 14 may also be provided to the surface of the medium body 1. The circulating area 14 is equipped with multiple circulating ID codes which are substantially the same as those shown in FIG. 3 for the playing ID codes. The circulating area 14, as well as the recording area 12 and the completion area 13 are arranged on the left side of the medium body 1 and occupy about 1 tenth of the area. When the user uses the Q pen to contact the circulating area 14, the circulating mode in the Q pen will then start playing the current message repeatedly.

The user may use multiple medium bodies 1 to compile into an album or a book with a lot of vivid recorded messages and drawings/pictures corresponding to the recorded messages so that the user may use the Q pen to play the previously recorded message while reviewing the messages/drawings/pictures. During the playing mode, if the circulating area is engaged by the Q pen, then the Q pen will repeatedly play the current message over and over again until the Q pen contact the completion area.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

1. An audio medium for a Q pen, the audio medium comprising a medium body equipped with a playing area which is provided with multiple playing ID codes, the Q pen plays a stored audio when the Q pen contacts a playing ID code in the playing area, wherein the improvements comprise:

a recording area arranged on a side of the medium body and having multiple recording ID codes associated with the Q pen, wherein the Q pen records audio input to a recording unit in the Q pen when the Q pen makes contact with a recording ID code in the recording area; and a completion area arranged on the side of the medium body and having multiple completion ID codes associated with the Q pen, wherein the Q pen stops recording the audio input to the recording unit and saves the audio input when the Q pen makes contact with a completion ID code in the completion area.

2. The audio medium as claimed in claim 1 further comprising a circulating area on the side of the audio medium and having multiple circulating ID codes associated with the Q pen, wherein the Q pen plays the stored audio repeatedly when the Q pen contacts a circulating ID code in the circulating area.

3. The audio medium as claimed in claim 2, wherein the recording area, the completion area and the circulating area are arranged on the left to the playing area.

4. The audio medium as claimed in claim 1 further comprising a mark to indicate a serial number.

5. The audio medium as claimed in claim 2 further comprising a mark to indicate a serial number.

6. The audio medium as claimed in claim 3 further comprising a mark to indicate a serial number.

7. The audio medium as claimed in claim 4, wherein the audio medium is made of a piece of paper, plastic or a metal.

8. The audio medium as claimed in claim 5, wherein the audio medium is made of a piece of paper, plastic or a metal.

9. The audio medium as claimed in claim 6, wherein the audio medium is made of a piece of paper, plastic or a metal.

* * * * *